April 29, 1941.　　　S. M. WECKSTEIN　　　2,239,867
SHAFT MOUNTING
Filed Feb. 10, 1939　　　2 Sheets-Sheet 2
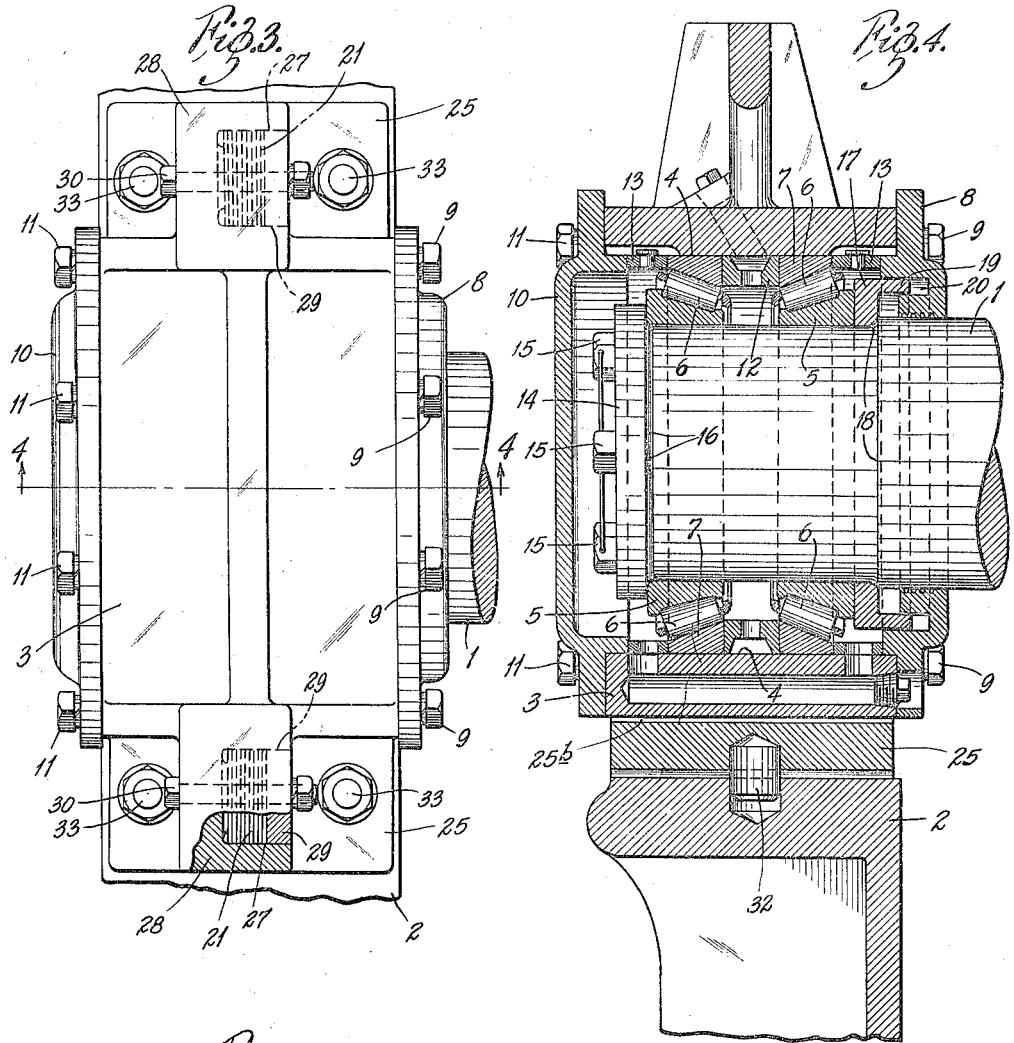
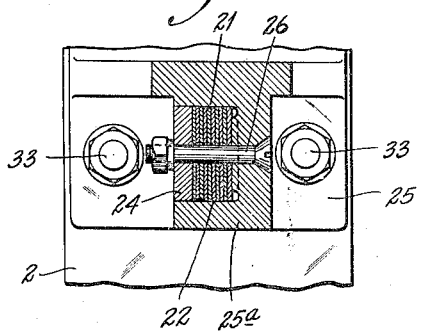
INVENTOR:
Samson M. Weckstein
HIS ATTORNEYS.

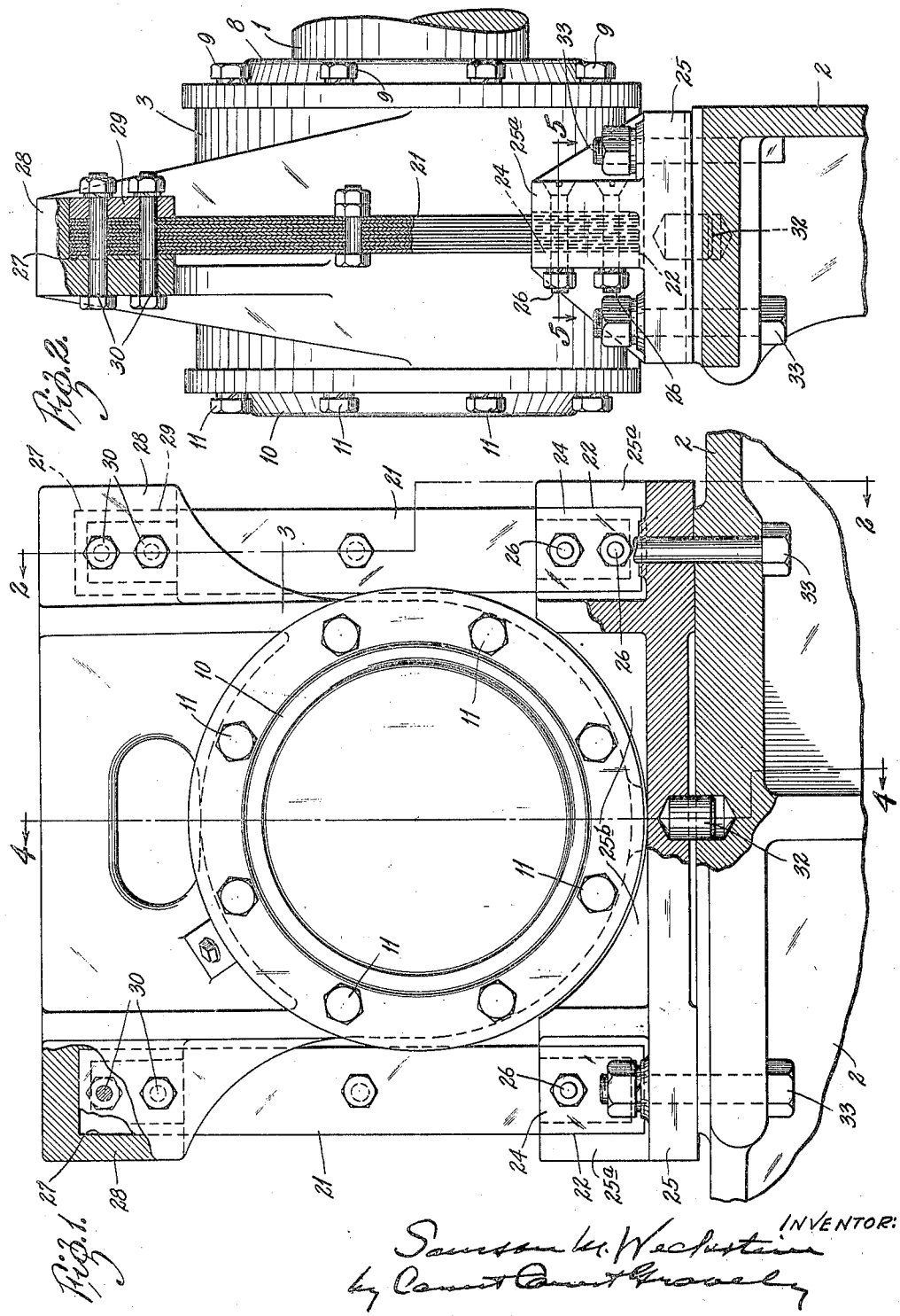

Patented Apr. 29, 1941

2,239,867

UNITED STATES PATENT OFFICE 2,239,867

SHAFT MOUNTING

Samson M. Weckstein, Canton, Ohio, assignor to The Timken Roller Bearing Company, Canton, Ohio, a corporation of Ohio Application February 10, 1939, Serial No. 255,609

6 Claims. (Cl. 308—26)

My invention relates to shaft mountings, particularly antifriction bearing mountings for shafts that are subject to endwise movement or changes in length. It has for its principal object a construction in which the bearing mounting is free to move with the shaft to automatically accommodate itself to changes in length, axial movement and angular misalinement of said shaft. Other objects are to provide for simplicity and cheapness of construction and compactness of design. The invention consists in the resilient shaft mounting and in the construction, combinations and arrangements of parts hereinafter described and claimed.

In the accompanying drawings, which form part of this specification and wherein like symbols refer to like parts wherever they occur, Fig. 1 is an outer end view of a roller bearing shaft mounting embodying my invention and a portion of the supporting framework therefor, portions of said mounting and framework being shown in vertical cross section, Fig. 2 is a vertical section on the line 2—2 in Fig. 1, Fig. 3 is a plan view of said shaft bearing mounting, Fig. 4 is a vertical central longitudinal section on the line 4—4 in Fig. 1, Fig. 5 is a fragmentary horizontal section on the line 5—5 in Fig. 2; and Fig. 6 is the perspective view of one of the clamping plates for the bearing housing supporting springs.

In the accompanying drawings my invention is shown embodied in a roller bearing mounting for one end of a rotary shaft or dryer roll 1 of a paper machine having a suitable supporting framework 2 and a fixed self-alining bearing mounting (not shown) for the other end of said dryer roll. The roller bearing shaft mounting shown in the accompanying drawings comprises a housing 3 having a cylindrical opening 4 extending horizontally therethrough adapted to receive the end portion of the rotating dryer roll and spaced bearings therefor of the tapered roller type. These bearings comprise cones or inner bearing members 5 mounted on the roll, tapered bearing rollers 6 mounted on said cones and cups or outer bearing members 7 mounted in the housing opening 4 whose inner end is closed by an annular closure plate 8 that is secured to the housing by screws 9 and whose outer end is closed by a cap 10 that is secured to said housing by screws 11. The cups or outer bearing members 7 are spaced apart by a sleeve 12 mounted in the housing opening 4; and said cups are clamped in the housing by the end closures 8 and 10 and rings 13 interposed therebetween. The bearings are held on the roll by a plate 14 that is secured by screws 15 to the end of said roll in abutting relation to the outermost bearing cone. Adjusting shims 16 are interposed between the retaining plate 14 and the end face of the roll; and an oil flinger ring 17 is clamped between the innermost cone and a shoulder 18 on said roll has an inwardly extending annular flange 19 that fits within an annular groove 20 provided therefor in the closure ring 8.

The bearing housing 3 is sustained for yielding movement in the direction of the roll axis preferably by means of a pair of substantially parallel and opposite upright plate or leaf springs 21 disposed one on each side of said housing. The lower ends of these leaf springs seat in recesses 22 provided therefor in the front faces of upstanding end lugs 25a on a base or plate member 25 and are firmly secured in said recesses between the vertical walls thereof and suitable clamping plates 24 therein by bolts 26 that extend horizontally through said lugs, leaf springs and clamping plates. The upper end portions of said springs fit within recesses 27 provided therefor in the rear faces of outstanding lugs 28 on the sides of the bearing housing 3 and are firmly secured in said recess by clamping plates 29 and by bolts 30 that pass through said lugs, springs and clamping plates. The base member 25 seats on the framework 2 directly below the bearing housing and has its two leaf spring supporting lugs 25a connected by an upstanding web 25b whose upper edge is curved to provide a clearance space between said web and the under side of said housing whereby said housing is sustained entirely free of said base member by the leaf springs 21. The base member is provided on its under side with a central depending dowel pin 32 that removably engages a recess provided therefor in the top of the framework 2; and said base member is rigidly secured to said framework by means of bolts 33 that pass vertically through said framework and the end portions of said base member.

By the arrangement described, the dryer roll 1 is rotatably supported against axial movement in the bearing housing 3; and the leaf springs 21 are adapted to flex or bend and thus permit the housing sustained entirely thereby clear of the base member 25 to move with and automatically accommodate itself to endwise bodily movement of said roll or to axial expansion and contraction thereof due to temperature changes. The springs, being disposed edgewise of the bearing housing 3, are well adapted to resist sideplay thereof. The springs are well adapted to carry the load imposed thereon and are preferably installed so that, when the roll is cold and is contracted to its shortest length, the springs will lean in by the amount allowed for expansion. However, when the dryer roll has expanded to its full length, the bearing supporting springs are in a substantial vertical position, as shown in the drawings, and thus carry only the radial load imposed upon the bearing. The resiliently and yieldingly supported mounting for one end of the dryer roll will also assist the fixed self-alining mounting for the opposite end thereof in taking care of angular misalinement of the dryer roll during the operation thereof.

Obviously numerous changes may be made without departing from the invention and I do not wish to be limited to the precise arrangement shown and described.

What I claim is:

1. A shaft mounting comprising a laminated flat metallic spring rigidly secured at one end, a shaft, and a housing rotatably supporting said shaft and rigidly secured to and sustained entirely by the other end of said laminated spring, said laminated spring being disposed crosswise of and edgewise to the axis of said shaft to thereby accommodate longitudinal movement and angular misalinement of said shaft through bending action of said laminated spring longitudinally of the shaft axis while substantially preventing bodily movement of said shaft crosswise of said axis.

2. A shaft mounting comprising a substantially vertically disposed laminated metallic leaf spring rigidly secured at one end, a horizontal shaft, and a housing rotatably supporting said shaft and rigidly secured to and sustained entirely by the other end of said laminated spring, said laminated spring being disposed with one vertical side edge edgewise to the axis of said shaft to thereby accommodate longitudinal movement and angular misalinement of said shaft through bending action of said laminated spring longitudinally of the shaft axis while substantially preventing bodily movement of said shaft crosswise of said axis.

3. A shaft mounting comprising a substantially vertically disposed laminated metallic leaf spring rigidly secured at its lower end, a horizontal shaft, and a housing rotatably supporting said shaft and rigidly secured to and sustained entirely by the upper end of said laminated spring, said laminated spring being disposed with one vertical side edge crosswise of and edgewise to the axis of said shaft to thereby accommodate axial expansion and contraction and angular misalinement of said shaft through bending action of said laminated spring longitudinally of the shaft axis while substantially preventing bodily movement of said shaft crosswise of said axis, said laminated springs being disposed substantially vertical in the fully expanded condition of said shaft.

4. A shaft mounting comprising a pair of spaced substantially parallel laminated flat springs rigidly secured at one end, a shaft, and a housing rotatably supporting said shaft and rigidly secured to and sustained entirely by the other ends of said laminated springs, said laminated springs being disposed crosswise of and edgewise to the axis of said shaft to thereby accommodate longitudinal movement and angular misalinement of said shaft through joint bending action of said laminated springs longitudinally of the shaft axis while substantially preventing bodily movement of said shaft crosswise of said axis.

5. A shaft mounting comprising a pair of spaced substantially vertically disposed laminated metallic springs rigidly secured at one end, a horizontal shaft, and a housing supporting said shaft and rigidly secured to and sustained entirely by the other ends of said laminated springs, said laminated springs being disposed with one vertical side edge edgewise to the axis of said shaft to thereby accommodate longitudinal movement and angular misalinement of said shaft through joint bending action of said laminated springs longitudinally of the shaft axis while substantially preventing bodily movement of said shaft crosswise of said axis.

6. A shaft mounting comprising a base member, a pair of spaced substantially vertically disposed laminated metallic springs rigidly secured at their lower ends to said base member, a horizontal shaft, and a housing located between said pair of laminated springs and rotatably supporting said shaft and rigidly secured to and sustained entirely by the upper ends of said laminated springs entirely clear of said base member, said laminated springs being disposed with one vertical side edge edgewise to the axis of said shaft to thereby accommodate axial expansion and contraction and angular misalinement of said shaft through joint bending action of said laminated springs longitudinally of the shaft axis while substantially preventing bodily movement of said shaft crosswise of said axis, said laminated springs being disposed substantially vertical in the fully expanded condition of said shaft.

SAMSON M. WECKSTEIN.